United States Patent [19]

Guazzo et al.

[11] 4,447,115

[45] May 8, 1984

[54] MULTIPLE CONNECTION FOR AN UNDERSEA CABLE SYSTEM

[75] Inventors: Lucien Guazzo; Jean-Pierre Trezeguet, both of Calais, France

[73] Assignee: Les Cables de Lyon, Clichy, France

[21] Appl. No.: 375,628

[22] Filed: May 6, 1982

[30] Foreign Application Priority Data

May 7, 1981 [FR] France .................................. 81 09070

[51] Int. Cl.³ ........................ H02G 15/14; G02B 7/26
[52] U.S. Cl. ................................ 350/96.2; 174/70 S;
174/71 R
[58] Field of Search .................... 174/70 S, 71 R, 87,
174/88 R, 88 C; 350/96.2

[56] References Cited

U.S. PATENT DOCUMENTS

| | | | |
|---|---|---|---|
| 2,155,650 | 4/1939 | Gilbert | 174/70 S |
| 4,189,620 | 2/1980 | Stange | 174/79 |
| 4,217,464 | 8/1980 | Oldham | 174/79 |

FOREIGN PATENT DOCUMENTS 2000390  1/1979  United Kingdom ............... 350/96.2

*Primary Examiner*—Laramie E. Askin

*Attorney, Agent, or Firm*—Sughrue, Mion, Zinn, Macpeak & Seas

[57] ABSTRACT

A multiple connection for connecting a plurality of armored cables (1, 2) to the housing of electrical apparatus in an undersea system having a cable interconnection point where a plurality of cables serving different destinations are brought together, each of said cables comprising a core surrounded by armor and being terminated by a length of bared core extending beyond a severed end of the armor, and said housing having a hollow cable-fixing part through which the bared cable cores pass, characterized in that said connection comprises:

a steel binding ring (12) through which the armored portion of each of said cables (1, 2), is threaded, said ring serving to bind said armored portions of cable together;

a steel tube (13) threaded over said bared cores (7, 8) of said cables, having one end abutting against severed end portions of the armor (9, 10) of said cables and having its other end fixed mechanically to said hollow cable-fixing part (5) of the electrical apparatus housing;

and auxiliary armor (14) wound around the portions of armored cable bound together by said ring and around the adjacent portion of said steel tube.

9 Claims, 2 Drawing Figures

MULTIPLE CONNECTION FOR AN UNDERSEA CABLE SYSTEM

FIELD OF THE INVENTION

The present invention relates to a multiple connection for interconnecting a plurality of armoured cables serving several different destinations and coming together at a cable interconnection point where they are all connected to a common electrical apparatus. The cables may be coaxial or optical fibre undersea cables for example, connected to the inlet or the outlet of an undersea telephone repeater, or more generally of an intermediate or terminal apparatus for undersea telephone links.

BACKGROUND OF THE INVENTION

At present it is known how to connect an undersea repeater to an armoured coaxial cable: in particular from the mechanical point of view, the traction force exerted by the cable when it is laid is transferred to the housing of the repeater by fixing the housing to the steel wire armour which protects the cable. However, in the aforementioned case of undersea telephone links with several cables serving different destinations, said technique or other known techniques for repeater connection would require the repeater to be equipped with as many separate mechanical accesses as there are cables to be connected.

The present invention aims to remedy this drawback by mechanically interconnecting a plurality of cables into a length of single cable before being connected to a repeater or the like. Thus a common connection via a single mechanical inlet or outlet access to the repeater can be used.

SUMMARY OF THE INVENTION

The present invention provides a multiple connection for connecting a plurality of armoured cables to the housing of electrical apparatus in an undersea system having a cable interconnection point where a plurality of cables serving different destinations are brought together, each of said cables comprising a core surrounded by armour and being terminated by a length of bared core extending beyond a severed end of the armour, and said housing having a hollow cable-fixing part through which the bared cable cores pass; said connection comprising:

a steel binding ring through which the armoured portion of each of said cables is threaded, said ring serving to bind said armoured portions of cable together;

a steel tube threaded over said bared cores of said cables, having one end abutting against severed end portions of the armour of said cables and having its other end fixed mechanically to said hollow cable-fixing part of the electrical apparatus housing;

and auxiliary armour wound around the portions of armoured cable bound together by said ring and around the adjacent portion of said steel tube.

Preferably the space inside said tube and inside said hollow cable-fixing part is filled with an electrically insulating substance.

Such a connection makes it possible to simultaneously connect several cables, in particular to the input or to the output of a repeater via a single corresponding mechanical access.

BRIEF DESCRIPTION OF THE DRAWING

The features and advantages of the invention become more clearly apparent from the following description of an embodiment illustrated in the accompanying drawing in which.

MORE DETAILED DESCRIPTION

Figure 1:
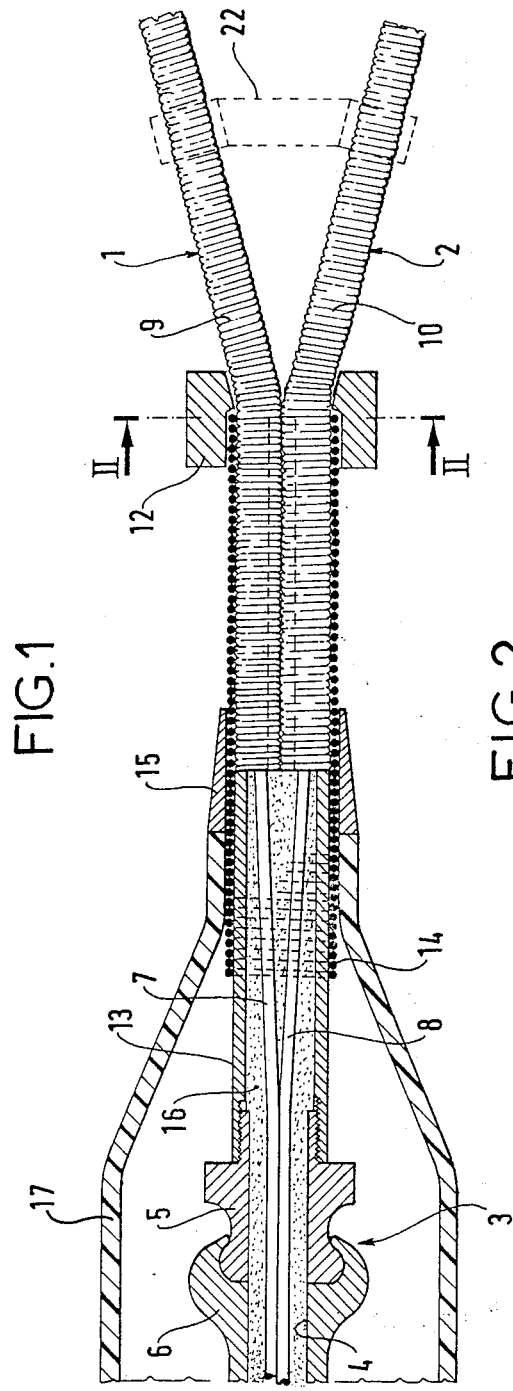
FIG. 1 is a partially cut away side view of a connection in accordance with the invention and FIG. 2 is a cross-section taken through one of its components about line II—II of FIG. 1.

FIG. 1 illustrates a connection made between two armoured cables 1 and 2 to connect them simultaneously to a hollow cable-fixing part 3 of electrical apparatus such as a repeater. The part 3 has an axial passage 4 and is here illustrated as being constituted by a component 5 with a spherical end which pivots on a fixing knuckle joint 6. In a known way, said cable-fixing part 3 forms a part of a set of components providing mechanical and electrical connection which may be of the articulated or the rigid type between said electric apparatus and/or its housing and a line cable of an undersea connection; it will therefore be understood that the type of connection illustrated here and its form are given simply by way of example.

In the undersea connection in question, the two cables 1 and 2 are armoured cables; they serve different destinations and are connected together at a cable interconnection point. The cores (insulated central conductors) of the two cables are referenced 7 and 8 and their respective steel wire outer armour is referenced 9 and 10.

The connection illustrated includes:

a steel binding ring 12 of circular cross-section, said binding ring being installed on the two armoured cables 1 and 2 which are independent from each other; it brings them side by side and binds them against each other; on one side of said ring 12, the two armoured cables are therefore independent and free, while on the other side, they are still electrically independent but constitute a single mechanical assembly;

a steel tube 13 installed around the bared cores 7 and 8 of the cable assembly obtained by the binding ring 12. The steel tube 13 is not in contact with the cores 7 and 8 which it protects, and it is installed abutting against the severed end portions of the armour 9 and 10 of the cables 1 and 2;

auxiliary armour 14 formed by steel wires helically wound both around the assembly of armoured cables obtained by the binding ring 12 and around the adjacent portion of the steel tube 13. Said auxiliary armour 14 is held by welding, binding or any other suitable means to the armoured cable assembly obtained by the binding ring 12. Further, the auxiliary armour 14 is likewise held to the steel tube 13 to which its end portion is fixed; and a steel ferrule 15 installed on said auxiliary armour over the severed end portions of the armour 9 and 10 and over the steel tube 13; it keeps the tube 13 centred relative to the ends of the cables 1 and 2.

In the connection thus made, the free end of the tube 13 is fixed to the hollow cable-fixing part 3. In the present example, said tube 13 has a tapped and threaded end which screws onto the corresponding threaded end of the component 5, with the central cores 7 and 8 then being brought together and passing through the hollow cable-fixing part. The central cores may be connected together to constitute a single inner conductor which results from their merging.

The connection further includes insulation 16 around the bared cores 7 and 8 and the interconnected central conductors (or the resulting single conductor). Said insulation 16 is obtained by injecting an insulating substance such as polyethylene into the empty space inside the tube 13 and the hollow cable-fixing part, e.g. via holes (not illustrated) in the tube 13.

Lastly, the connection which connects the two cables 1 and 2 together is finished off by a protective outer sleeve 17 made of neoprene, for example, and installed around the cable-fixing part 3 and around the tube 13 which is partially covered by the auxiliary armour 14. Said sleeve 17 abuts against the ferrule 15 which holds it; it is held at its other end on the housing of electrical equipment (not shown).

Figure 2:
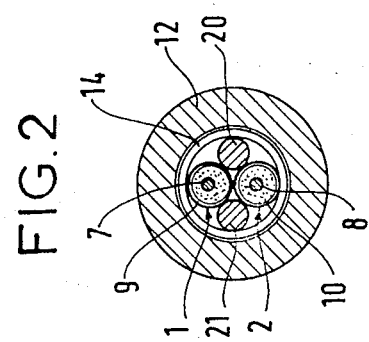

As illustrated in FIG. 2, which is a cross-section through the binding ring 12, it will be observed that filler components 20 and 21 are associated with the cables 1 and 2 in the binding ring 12 so that the structure of the assembly remains circular.

Further, as schematically illustrated by dashed lines in FIG. 1, the armoured cables 1 and 2 may be kept spaced apart by auxiliary spacer pieces 22 before being connected together.

In the version illustrated in FIG. 1, the central conductors of the cables 1 and 2 retain their individual initial insulation where they simultaneously enter side-by-side into the axial passage of the hollow cable-fixing part 3. However, these central conductors could also be connected together if need be.

The invention is described with reference to the illustrations given in the accompanying drawings and it is obvious that various means can be substituted by other technically equivalent means without thereby going beyond the scope of the invention. Thus, in a variant of the connection described and which can be deduced directly from the accompanying figures, the cores described as being constituted by the insulated central conductors of the coaxial cables could be constituted by sets of optical fibres which form part of undersea optical fibre cables. It is also obvious that the connection need not relate only to two cables but could also relate to three or even more which are all to be connected to the input or the output of the same electrical apparatus via a cable-fixing part which is integral with the housing of said apparatus.

We claim:

1. A multiple connection for connection a plurality of armoured cables to the housing of electrical apparatus in an undersea system having a cable interconnection point where a plurality of cables serving different destinations are brought together, each of said cables comprising a core surrounded by armour and being terminated by a length of bared core extending beyond a severed end of the armour, and said housing having a hollow cable-fixing part through which the bared cable cores pass; said connection comprising:

a steel binding ring through which the armoured portion of each of said cables is threaded, said ring serving to bind said armoured portions of cable together;

a steel tube threaded over said bared cores of said cables, having one end abutting against severed end portions of the armour of said cables and having its other end fixed mechanically to said hollow cable-fixing part of the electrical apparatus housing;

and auxiliary armour wound around the portions of armoured cable bound together by said ring and around the adjacent portion of said steel tube.

2. A connection according to claim 1, wherein the space inside said tube and inside said hollow cable-fixing part is filled with an electrically insulating substance.

3. A connection according to claim 1, having a steel ferrule installed around said auxiliary armour over the severed ends of the armour of said cables and over an adjacent portion of said steel tube to keep said steel tube centred relative to the assembled cables.

4. A connection according to claim 1, including filler components installed with said armoured cables in said binding ring in contact with adjacent armoured cables on opposite sides thereof so that the structure of the resulting cable and filler assembly remains substantially circular.

5. A connection according to claim 1, further including a protective outer sleeve installed around said steel tube and fixed to said auxiliary armour and around said hollow cable-fixing part.

6. A connection according to claim 1, wherein said auxiliary armour is fixed to said binding ring and to said steel tube.

7. A connection according to claim 1, wherein said cores are constituted by the central conductors of coaxial cables including insulation individually surrounding the central conductors and wherein said central conductors are protected by their individual insulation where they pass simultaneously side by side through said hollow cable-fixing part.

8. A connection according to claim 1, wherein said cores are constituted by the central conductors of coaxial cables and are bared inside said steel tube and are electrically connected together where they pass through said hollow cable-fixing part.

9. A connection according to claim 1, wherein said cores are constituted by sets of optical fibres forming optical fibre cables.

* * * * *